Dec. 20, 1938.  R. A. GOEPFRICH  2,140,741
BRAKE
Filed May 4, 1936  7 Sheets-Sheet 1

INVENTOR.
RUDOLPH A. GOEPFRICH
BY
*M. W. McConkey*
ATTORNEY

Dec. 20, 1938.    R. A. GOEPFRICH    2,140,741
BRAKE
Filed May 4, 1936    7 Sheets-Sheet 2

INVENTOR.
RUDOLPH A. GOEPFRICH
BY M.W. McConkey
ATTORNEY

Dec. 20, 1938.    R. A. GOEPFRICH    2,140,741
BRAKE
Filed May 4, 1936    7 Sheets-Sheet 3

INVENTOR.
RUDOLPH A. GOEPFRICH
BY M. W. McConkey
ATTORNEY

Dec. 20, 1938.                R. A. GOEPFRICH                2,140,741
                                  BRAKE
                            Filed May 4, 1936              7 Sheets-Sheet 4

INVENTOR.
RUDOLPH A. GOEPFRICH
BY   M.W. McConkey
                ATTORNEY

Dec. 20, 1938.   R. A. GOEPFRICH   2,140,741
BRAKE
Filed May 4, 1936   7 Sheets-Sheet 5

INVENTOR.
RUDOLPH A. GOEPFRICH
BY
M. W. McConkey
ATTORNEY

Dec. 20, 1938.   R. A. GOEPFRICH   2,140,741
BRAKE
Filed May 4, 1936   7 Sheets-Sheet 6

INVENTOR.
RUDOLPH A. GOEPFRICH
BY
ATTORNEY

Dec. 20, 1938.  R. A. GOEPFRICH  2,140,741
BRAKE
Filed May 4, 1936  7 Sheets-Sheet 7

INVENTOR.
RUDOLPH A. GOEPFRICH
BY
ATTORNEY

Patented Dec. 20, 1938

2,140,741

UNITED STATES PATENT OFFICE 2,140,741

BRAKE

Rudolph A. Goepfrich, South Bend, Ind., assignor to Bendix Products Corporation, South Bend, Ind., a corporation of Indiana Application May 4, 1936, Serial No. 77,660

14 Claims. (Cl. 188—78)

This invention relates to brakes, and is illustrated as embodied in a number of internal expanding brakes for use on automobile wheels.

An object of the invention is to make the brake fully controllable, by arranging the anchorage as far out radially of the brake as possible, and to that end taking the braking torque directly from the ends of the rims of the brake shoes, while arranging compact and effective applying means immediately radially inside the anchorage and between and acting on the ends of the webs of the shoes.

Various features and advantages of the invention, including novel structural arrangements and advantageous particular constructions, will be apparent from the following description of the illustrative embodiments shown in the accompanying drawings, in which:

Figure 1:
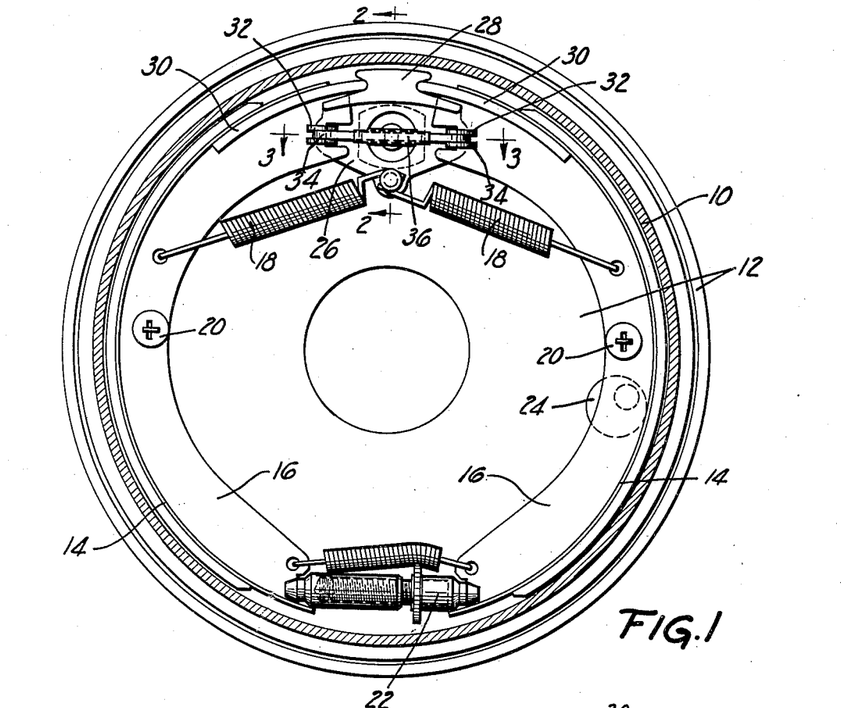
Figure 1 is a vertical section through a brake embodying the invention, in a plane just inside the head of the brake drum, and showing the brake shoes in side elevation.
Figure 2:
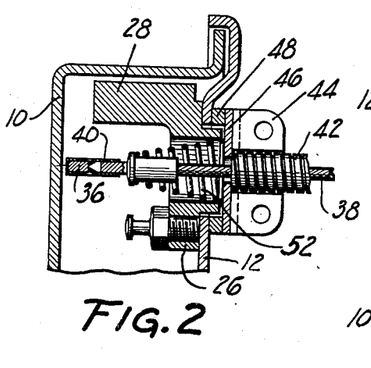
Figure 2 is a partial radial section therethrough, on the line 2—2 of Figure 1.
Figure 3:
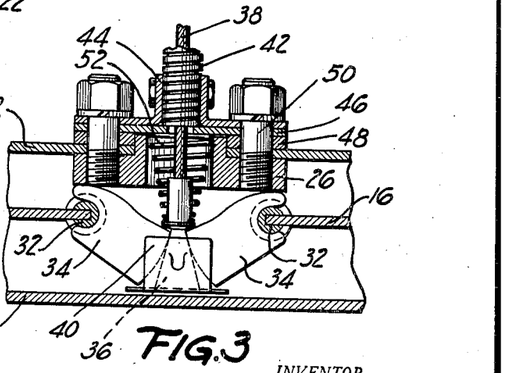
Figure 3 is a partial section therethrough on the line 3—3 of Figure 1.

The brake of Figures 1–3 includes a rotatable drum 10, at the open side of which is a backing plate or support 12. Inside the brake are two interchangeable shoes, faced with the usual friction lining, and each comprising a rim 14 welded or otherwise secured to a web 16. The shoes are provided with suitable return springs 18 and steady rests 20, and are shown connected at their lower ends by an adjustable device 22. Adjustable eccentrics or other stops 24 may be provided to determine the released positions of the shoes.

Mounted on the backing plate 12 at the top of the brake is an anchorage device 26 having a fixed part or anchor 28 adjacent the drum 10, and which is formed with sockets receiving the ends of reinforcing plates 30 welded to the inner faces of and forming integral extensions of the ends of the rims 14. Thus the rims 14 transmit the braking torque directly to the anchor 28, as far out radially of the brake as it is possible to go.

Immediately radially inside of the anchor 28, the ends of the webs 16 are notched to receive cylindrical spool-shaped pivot members 32, which are slotted to embrace the webs as shown in Figure 3, and which are pivotally seated in rounded notches in the ends of links 34 which form a horizontal brake-applying toggle. The other ends of the links 34 are formed on arcs, to roll on a wedge-shaped member 36 connected to be actuated, by a tension element such as a cable 38 passing perpendicularly through the backing plate 12. The wedge-shaped member 36 carries a U-section stamping 40 which embraces the ends of the links 34 to hold the links and member 36 in alignment.

After passing through the backing plate 12, exteriorly of the brake the cable 38 is housed in a flexible conduit 42, the cable and conduit forming a Bowden-type control for the brake. The end of the conduit 42 is clamped in a tubular boss formed on a stamping 44 which seats against a plate 46 which in turn engages a ring or washer 48 engaging the backing plate. These parts are held together, and are secured to the backing plate, by means such as bolts 50 which are threaded into the anchorage device 26, and therefore also serve to attach that device to the backing plate. The above-described novel brake-applying device is actuated against the resistance of a spring 52 confined between the members 36 and 46.

In the brake of Figures 4 to 8, the rims 14 engage a fixed part or stop 54 forming part of a stamping secured to the backing plate 12 by fastenings, such as bolts 56, which also secure against the exterior face of the backing plate a fluid-power actuator shown as including a horizontal hydraulic cylinder 58 formed at 60 for connection to the usual hydraulic system, and having the usual removable bleeder plug 62.

Figure 4:
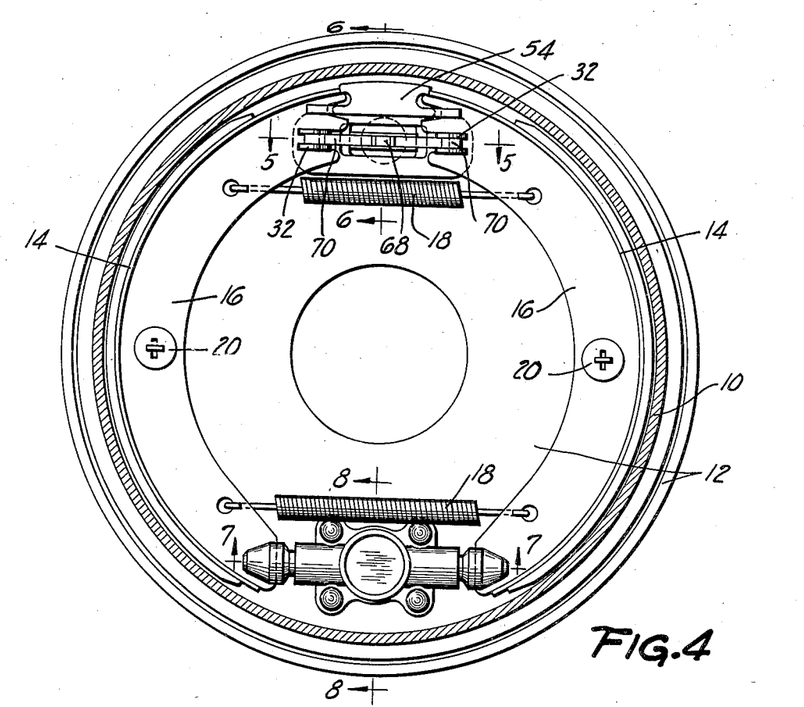
Figure 4 is a section, corresponding to Figure 1, through another brake.
Figure 5:
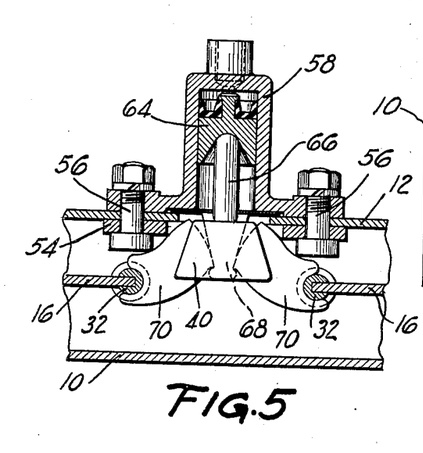
Figure 5 is a partial section on the line 5—5 of Figure 4.
Figure 6:
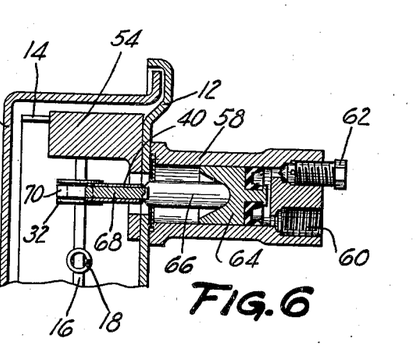
Figure 6 is a partial radial section on the line 6—6 of Figure 4.

The cylinder 58 contains a piston 64 which acts against a thrust link 66 in engagement with a wedge-shaped member 68 upon which roll the rounded ends of toggle links 70 mounted on the pivots 32.

Figures 7, 8:
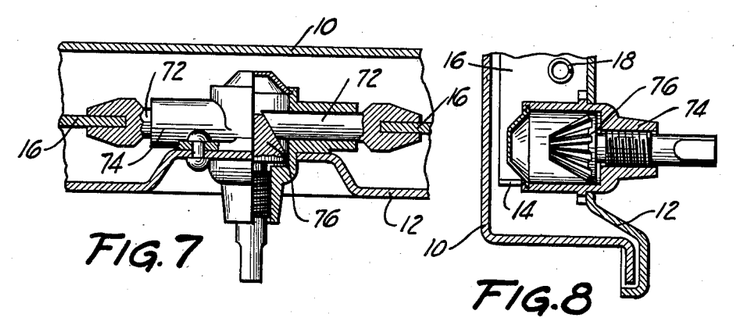
Figure 7 is a partial section on the line 7—7 of Figure 4.
Figure 8 is a partial radial section on the line 8—8 of Figure 4.

The lower ends of the webs 16 are seated in slots in the ends of thrust members 72 sliding (as shown in Figure 7) in sockets in a housing 74 riveted to the backing plate. The ends of the members 72 are beveled, for engagement with a conical adjusting wedge 76 having a stem threaded through a boss in the housing 74, and which is therefore accessible from the exterior of the brake. The whole assembly at the bottom of the brake forms an adjustable anchorage for the two brake shoes.

Figure 9:
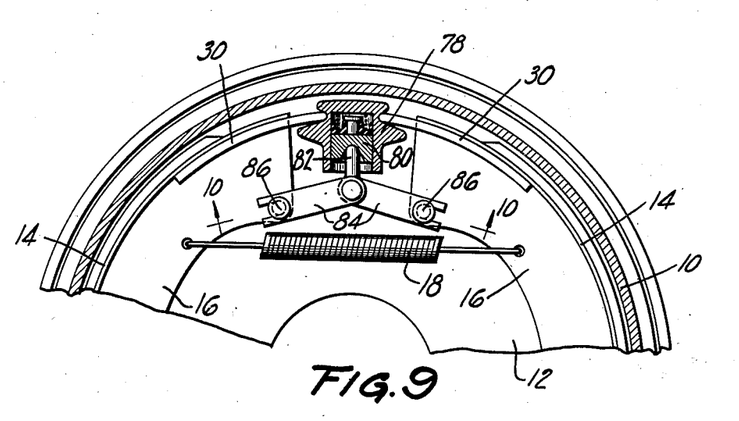
Figure 9 is a partial vertical section, corresponding to the upper part of Figure 1, showing a third brake.
Figure 10:
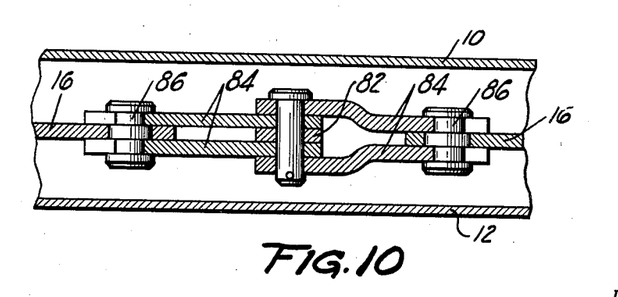
Figure 10 is a partial section therethrough, on the line 10—10 of Figure 9.

In the arrangement of Figures 9 and 10, the rims 14 anchor in sockets formed in a cylinder 78, secured to the inner face of the backing plate with its axis vertical. The cylinder 78 contains a piston 80 connected by a thrust link 82 to an actuating toggle comprising links 84 slotted at their ends to embrace pivots 86 mounted in the ends of the webs 16.

Figures 11, 12, 13:
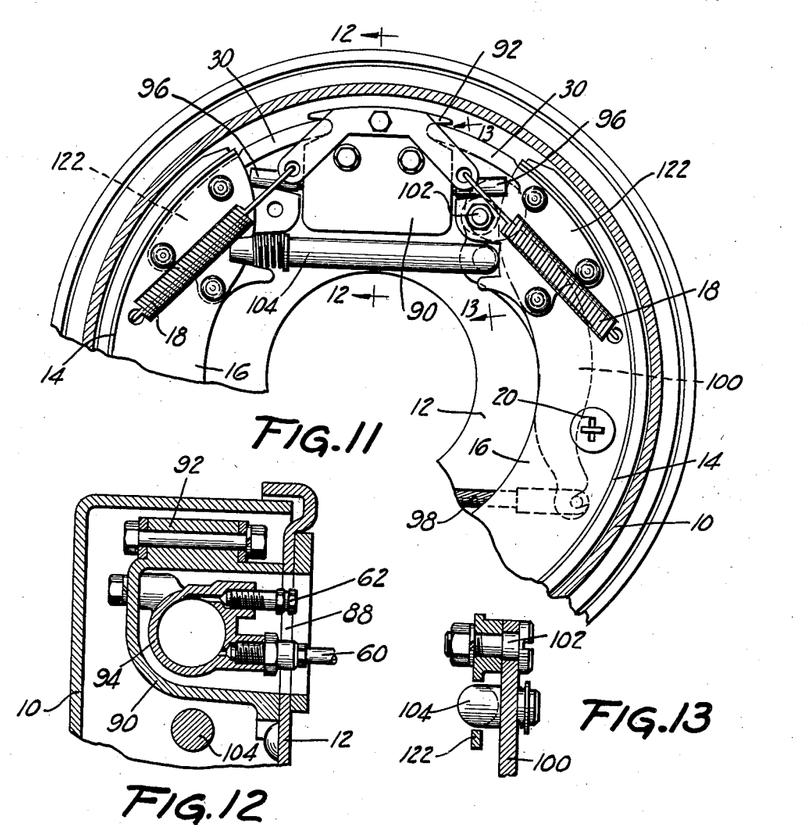
Figure 11 is a partial vertical section, corresponding to the upper part of Figure 1, and showing still a different brake.
Figure 12 is a partial radial section therethrough on the line 12—12 of Figure 11.
Figure 13 is a partial section through the applying means, on the line 13—13 of Figure 11.
Figure 14:
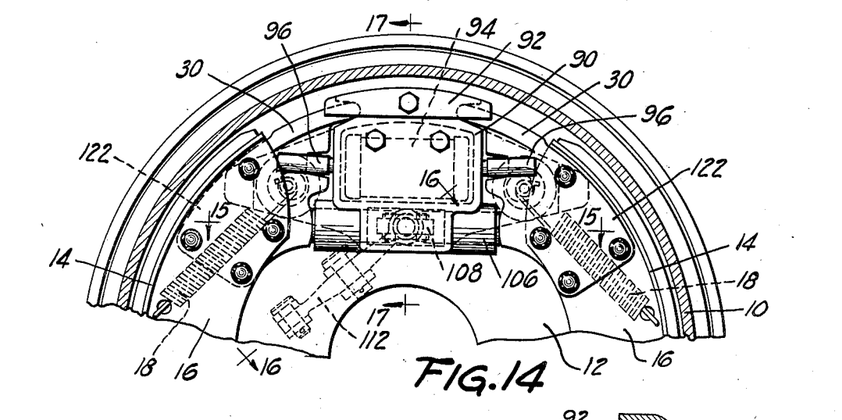
Figure 14 is a partial vertical section, corresponding to the upper part of Figure 1, but showing still another brake.
Figure 15:
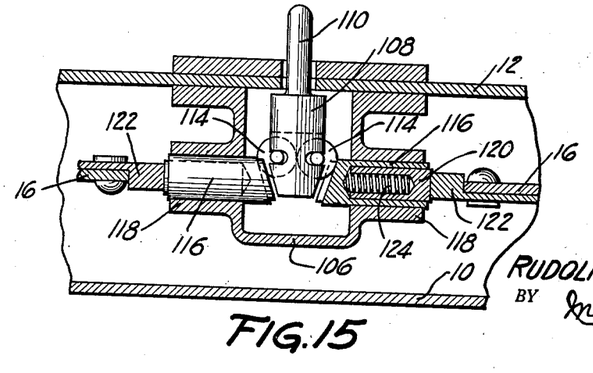
Figure 15 is a partial section through the brake of Figure 14, on the line 15—15 of Figure 14.
Figures 16, 17:
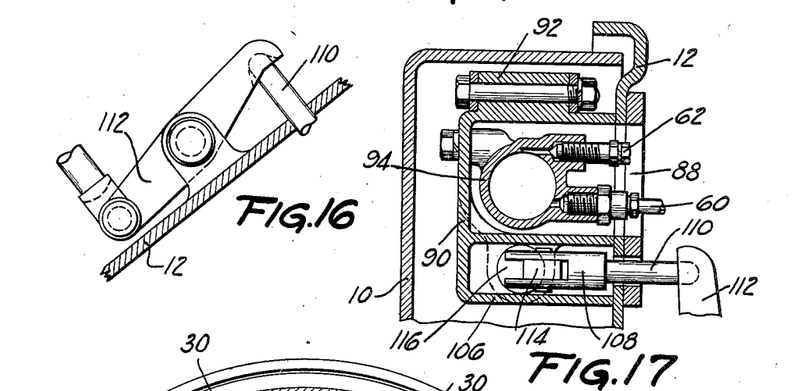
Figure 16 is a partial section on the line 16—16 of Figure 14.
Figure 17 is a partial radial section on the line 17—17 of Figure 14.

In the brake of Figures 11–13, the backing plate is formed in its upper portion with a relatively large opening 88 over which, on the inner face of the backing plate, is bolted a housing 90 formed at its top with an anchor projection 92 having in its sides sockets receiving the anchoring ends of the shoe rims or of the reinforcing plates 30 forming projecting parts of the rims. Inside the housing 90 may be arranged a brake-applying device readily accessible through the opening 88, and shown as comprising a hydraulic cylinder 94 in which are arranged pistons having thrust links 96 slotted to embrace the ends of the webs 16. The cylinder 94 may be bolted or otherwise secured to the housing 90.

This brake may be alternatively actuated by connections from the usual emergency hand-operated brake lever, these connections including at each of the rear brakes a Bowden-type control including a cable 98 actuating a floating lever 100 connected by a pivot 102 to a plate mounted on one web 16, and by a link 104 to the other web 16. The link 104 extends horizontally across the brake just below the housing 90. The lever 100 swings in a vertical plane paralleling the backing plate, and between the backing plate and the adjacent web 16.

The brake of Figures 14–17 is like that just described, except that the housing 90 is extended to form a compartment 106 containing a horizontal wedge 108 acting on the webs 16, and which is operated by a thrust link 110 rigid therewith and connecting it to a lever 112 pivotally mounted on the outside of the backing plate. The wedge 108 carries a pair of floating rollers 114 in peripheral engagement with each other, and provided with spindles floating in slots formed crosswise of the member 108. The rollers 114 act on the beveled ends of plungers 116 guided in bosses 118 of the housing part 106. The plungers 116 telescopically receive thrust elements 120 engaging plates 122 rigidly riveted to the webs 16. Springs 124 may be provided to urge parts 116 and 120 apart against the rollers 114 and the plates 122.

Figure 18:
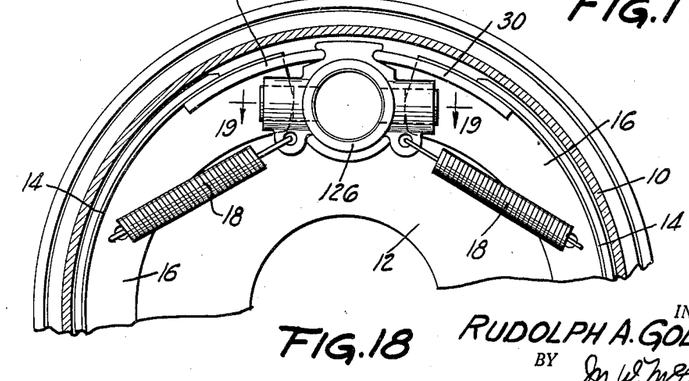
Figure 18 is a partial vertical section, corresponding to the upper part of Figure 1, and showing still another brake.
Figure 19:
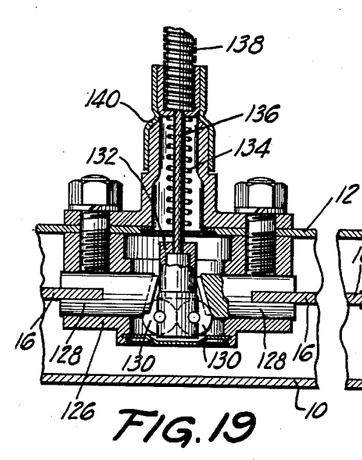
Figure 19 is a partial section therethrough on the line 19—19 of Figure 18.

The brake of Figures 18 and 19 comprises a housing 126 mounted on the backing plate, and the upper part of which is formed with sockets anchoringly receiving the rim reinforcements 30. The housing 126 is formed with aligned bosses bored to receive plungers 128 slotted to embrace the ends of the webs 16, and beveled for wedging engagement with transversely-floating rollers 130 carried by a member 132 operated (against the resistance of a spring 134) by a cable 136 forming part of a Bowden-type control. The conduit 138 of the control is secured to a fitting 140 secured to the exterior of the backing plate.

Figure 20:
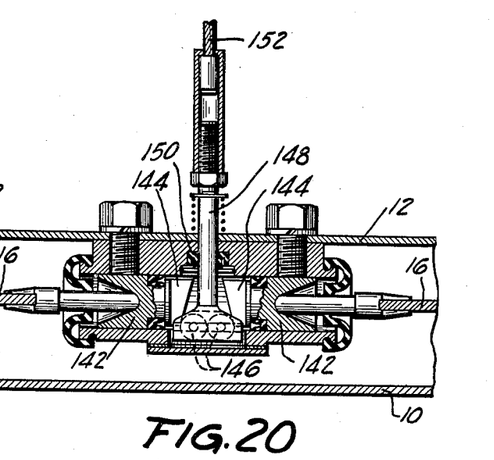
Figure 20 is a view corresponding to Figure 19, but showing an alternative construction.

In lieu of the actuator of Figure 19, that of Figure 20 may be used. In this case, the plungers 128 are replaced by pistons 142 adapted to be hydraulically actuated, and having parts 144 beveled for alternative actuation by rollers 146 carried by a plunger 148 passing through a packing 150 and actuated by a cable or the like 152.

Figure 21:
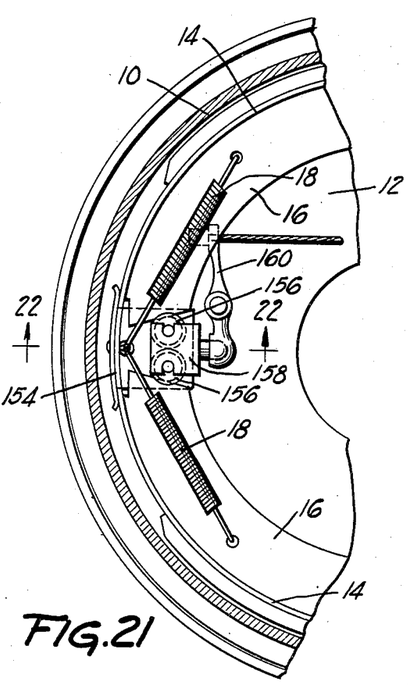
Figure 21 is a partial vertical section through still another brake.
Figure 22:
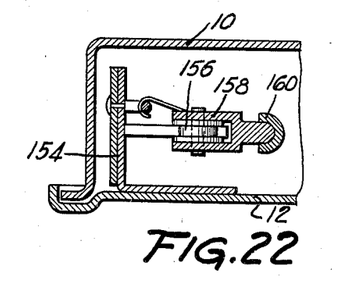
Figure 22 is a partial section radially therethrough, on the line 22—22 of Figure 21.

In Figures 21 and 22 the shoe rims anchor against a stamping 154 secured to the inner face of the backing plate, and the actuation is by rollers 156 acting on the beveled ends of the webs 16, and carried by a horizontally-movable member 158 operated by a vertical cable-operated lever 160.

Figure 23:
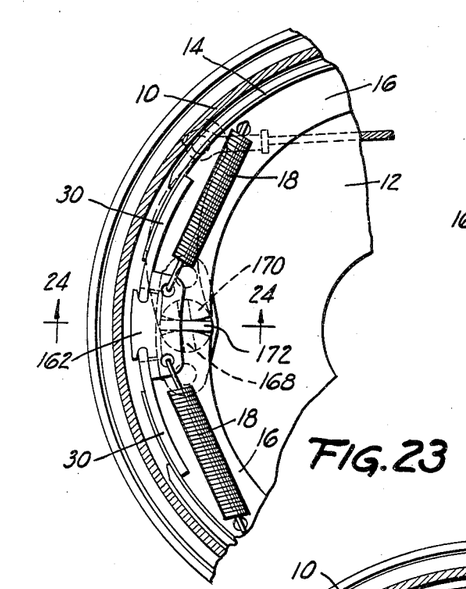
Figure 23 is a partial vertical section through still another brake.
Figure 24:
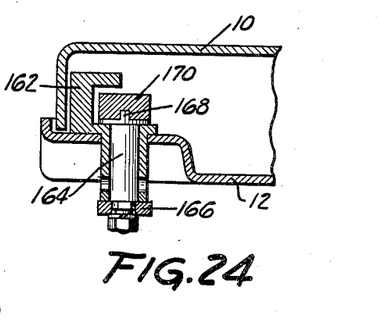
Figure 24 is a partial radial section therethrough, on the line 24—24 of Figure 23.

The brake of Figures 23 and 24 comprises an anchorage device 162 secured to the backing plate and formed with sockets in which the plates 30 anchor, and also having a boss extending through the backing plate and forming a bearing for a shaft 164. The shaft 164 is provided with an operating lever 166 on the outside of the brake, and on its inner end is formed with a diametrically-arranged key 168 received in a corresponding keyway in a rotatable cam 170 having a cam lug 172 between the ends of the webs 16. The key 168 and its keyway are arranged to permit the cam 170 to float transversely to balance the thrusts on the two shoes.

Figure 25:
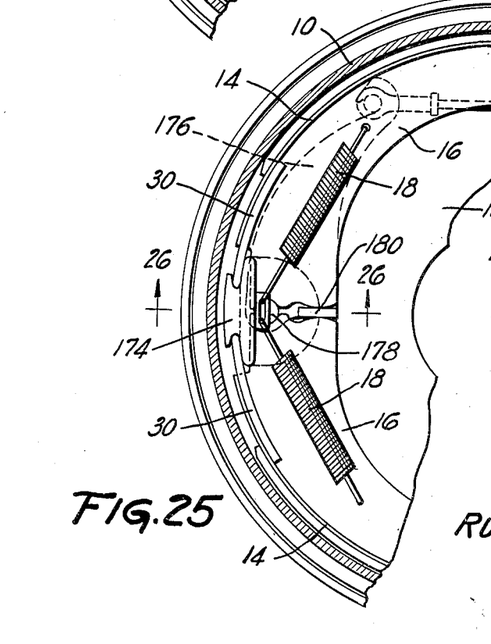
Figure 25 is a partial vertical section through still another brake.
Figure 26:
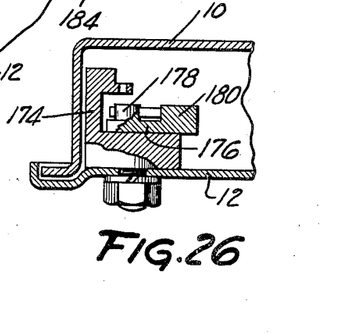
Figure 26 is a partial radial section therethrough, on the line 26—26 of Figure 25.

In Figures 25 and 26 the rim plates 30 anchor in sockets in the sides of an anchorage device 174 bolted to the backing plate. The brake operator comprises a lever 176 extending upwardly from the anchor, and having at its lower end a cylindrical lug 178 received in two semicircular notches in the ends of the webs 16, and a flat thrust lug 180 arranged between the ends of the webs 16. The lever 176 swings in a plane paralleling the backing plate and the web 16 of the upper shoe, and is operated by a Bowden-type control including a cable 182 passing through the backing plate horizontally at an acute angle and housed exteriorly of the brake in a flexible conduit 184 the end of which is secured to the backing plate.

While a number of brakes embodying my invention have been described in detail, it is not my intention to limit the scope of the invention to those particular brakes, or otherwise than by the terms of the appended claims.

I claim:

1. A brake comprising a backing plate having mounted thereon a pair of connected shoes each formed with a web and with a rim projecting beyond the end of the web at the unconnected end of its shoe, an anchorage device mounted on the backing plate and having a part between and engaged by said projecting rims and serving as the brake anchor and having a second part constructed to cooperate with the shoe webs in supporting a brake-applying device, and a brake-applying device supported by said second part and by the shoe webs and acting on the shoe webs to apply the brake and which comprises a force-transmitting medium acting at right angles to the backing plate.

2. A brake comprising a backing plate having mounted thereon a pair of connected shoes each formed with a web and with a rim projecting beyond the end of the web at the unconnected end of its shoe, an anchorage device mounted on the backing plate and having a part between and engaged by said projecting rims and serving as the brake anchor and having a second part constructed to cooperate with the shoe webs in supporting a brake-applying device, and a mechanical brake-applying device supported by said second part and by the shoe webs and acting on the shoe webs to apply the brake.

3. A brake comprising a backing plate having mounted thereon a pair of connected shoes each formed with a web and with a rim projecting beyond the end of the web at the unconnected end of its shoe, an anchorage device mounted on the backing plate and having a part between and engaged by said projecting rims and serving as the brake anchor and having a second part constructed to cooperate with the shoe webs in supporting a brake-applying device, and a brake-applying device comprising a toggle connected to the shoe webs and an actuator therefor supported in part by said second part of the anchorage device.

4. A brake comprising a backing plate having mounted thereon a pair of connected shoes each formed with a web and with a rim projecting beyond the end of the web at the unconnected end of its shoe, an anchorage device mounted on the backing plate and having a part between and engaged by said projecting rims and serving as the brake anchor and having a second part constructed to cooperate with the shoe webs in supporting a brake-applying device, and a brake-applying device comprising a toggle connected to the shoe webs and a flexible tension element connected to the toggle and passing through the backing plate at right angles thereto and a flexible conduit housing the tension element outside the backing plate and secured at its end to the backing plate.

5. A brake comprising a backing plate having mounted thereon a pair of connected shoes each formed with a web and with a rim projecting beyond the end of the web at the unconnected end of its shoe, an anchorage device mounted on the backing plate and having a part between and engaged by said projecting rims and serving as the brake anchor and having at opposite sides notches embracing the ends of said rims and positioning the shoes radially, a mechanical spreading device acting on the ends of the shoe webs, and an actuator for the spreading device supported in part by the backing plate and passing through the backing plate.

6. A brake comprising a backing plate having mounted thereon a pair of connected shoes each formed with a web and with a rim projecting beyond the end of the web at the unconnected end of its shoe, an anchorage device mounted on the backing plate and having a part between and engaged by said projecting rims and serving as the brake anchor and having at opposite sides notches embracing the ends of said rims and positioning the shoes radially, a brake-applying toggle acting on the ends of the shoe webs, and an actuator for the toggle supported at least in part by the backing plate.

7. A brake comprising a backing plate having mounted thereon a pair of connected shoes each formed with a web and with a rim projecting beyond the end of the web at the unconnected end of its shoe, an anchorage device mounted on the backing plate and having a part between and engaged by said projecting rims and serving as the brake anchor, a floating lever acting on the ends of the shoe webs and swinging in a plane paralleling the backing plate, a flexible conduit on the other side of the backing plate from said lever and secured at its end to the backing plate, and a tension element secured at its end to the lever and passing through the backing plate at an acute angle and housed exteriorly of the brake by said conduit.

8. A brake comprising a backing plate formed adjacent its edge with a relatively large opening, shoes within the brake mounted on the backing plate and each formed with a web and with a rim projecting beyond the end of the web at the end of the shoe, a housing within the brake secured over said opening and having a part between and engaged by the projecting ends of the rims and serving as the brake anchor, a fluid power brake actuator mounted within said housing and accessible from the exterior of the brake through said opening and having thrust means acting on the ends of the shoe webs, and a mechanical actuator also within said housing and acting on the ends of the shoe webs.

9. A brake comprising a backing plate formed adjacent its edge with a relatively large opening, shoes within the brake mounted on the backing plate and each formed with a web and with a rim projecting beyond the end of the web at the end of the shoe, a housing within the brake secured over said opening and having a part between and engaged by the projecting ends of the rims and serving as the brake anchor, a fluid power brake actuator mounted within said housing and accessible from the exterior of the brake through said opening and having thrust means acting on the ends of the shoe webs, and a mechanical actuator between the fluid power actuator and the center of the brake and acting on the ends of the shoe webs.

10. A brake comprising a backing plate formed adjacent its edge with a relatively large opening, shoes within the brake mounted on the backing plate and each formed with a web and with a rim projecting beyond the end of the web at the end of the shoe, a housing within the brake secured over said opening and having a part between and engaged by the projecting ends of the rims and serving as the brake anchor, and a fluid power brake actuator mounted within said housing and accessible from the exterior of the brake through said opening and having thrust means acting on the ends of the shoe webs.

11. A brake comprising a backing plate having mounted thereon a pair of shoes each having a web and a rim, a device adjacent the periphery of the brake mounted on the backing plate and having a fixed part engaged by the ends of the rims of the shoes, said part being formed on its opposite sides with notches embracing the ends of said rims and positioning the shoes radially, a spreading device immediately radially inside said fixed part and engaging the ends of the webs of the shoes, and means operating said spreading device and supported at least in part by the backing plate.

12. A brake comprising a backing plate having mounted thereon a pair of shoes each having a web and a rim, a device adjacent the periphery of the brake mounted on the backing plate and having a fixed part engaged by the ends of the rims of the shoes, said part being formed on its opposite sides with notches embracing the ends of said rims and positioning the shoes radially, a spreading device immediately radially inside said fixed part and engaging the ends of the webs of the shoes, and means operating said spreading device and supported at least in part by the backing plate, and including transmitting means acting on the spreading device and passing perpendicularly through the backing plate.

13. A brake comprising a backing plate having mounted thereon a pair of shoes each having a web and a rim, a device adjacent the periphery of the brake mounted on the backing plate and having a fixed part engaged by the ends of the rims of the shoes, a spreading device immediately radially inside said fixed part and engaging the ends of the webs of the shoes, and a fluid power actuator mounted on the exterior of the backing plate and having a force-transmitting member extending through the backing plate and connected to the spreading device.

14. A brake comprising a backing plate having mounted thereon a pair of shoes each having a web and a rim, a device adjacent the periphery of the brake mounted on the backing plate and having a fixed part engaged by the ends of the rims of the shoes, a spreading device immediately radially inside said fixed part and engaging the ends of the webs of the shoes, and means operating said spreading device and supported at least in part by the backing plate, together with an anchorage for the ends of the shoes opposite the spreading device.

RUDOLPH A. GOEPFRICH.